(12) United States Patent
Williamsson et al.

(10) Patent No.: US 9,948,903 B2
(45) Date of Patent: Apr. 17, 2018

(54) METHOD FOR CONFIGURATION OF VIDEO STREAM OUTPUT FROM A DIGITAL VIDEO CAMERA

(71) Applicant: Axis AB, Lund (SE)

(72) Inventors: Marcus Williamsson, Lund (SE); Daniel Molin, Lund (SE); Magnus Erkenfelt, Lund (SE)

(73) Assignee: Axis AB, Lund (SE)

( * ) Notice: Subject to any disclaimer, the term of this patent is extended or adjusted under 35 U.S.C. 154(b) by 210 days.

(21) Appl. No.: 14/741,069

(22) Filed: Jun. 16, 2015

(65) Prior Publication Data

US 2016/0006990 A1    Jan. 7, 2016

(30) Foreign Application Priority Data

Jul. 3, 2014 (EP) .................................. 14175616

(51) Int. Cl.
    *H04N 7/12*      (2006.01)
    *H04N 7/18*      (2006.01)
    (Continued)

(52) U.S. Cl.
CPC ........... *H04N 7/183* (2013.01); *G08B 13/196* (2013.01); *G08B 13/19656* (2013.01); *G08B 13/19663* (2013.01); *G08B 13/19671* (2013.01); *H04N 5/23206* (2013.01); *H04N 5/23216* (2013.01); *H04N 7/24* (2013.01); *H04N 9/045* (2013.01); *H04N 21/23439* (2013.01); *H04N 21/4223* (2013.01); *H04N 21/4312* (2013.01); *H04N 21/6379* (2013.01); *H04N 2007/243* (2013.01); *H04N 2007/246* (2013.01); *H04N 2101/00* (2013.01)

(58) Field of Classification Search
CPC ......... H04N 5/23206; H04N 21/23439; H04N 21/4223; H04N 21/6379
See application file for complete search history.

(56) References Cited

U.S. PATENT DOCUMENTS

| | | |
|---|---|---|
| 2006/0282867 A1 | 12/2006 | Mizuhashi et al. |
| 2012/0007866 A1 | 1/2012 | Tahan |
| 2013/0187897 A1 | 7/2013 | Liu |

FOREIGN PATENT DOCUMENTS

| | | |
|---|---|---|
| EP | 1 069 764 A2 | 1/2001 |
| EP | 2 495 972 A1 | 9/2004 |

(Continued)

OTHER PUBLICATIONS

EP 14 17 5616 European Search Report (dated Jan. 16, 2015).

*Primary Examiner* — Young Lee
(74) *Attorney, Agent, or Firm* — Volpe and Koenig, P.C.

(57) ABSTRACT

A method for configuration of video stream output from a digital video camera. A digital video camera connected to a communication network, using a first video stream of a scene is produced; a second video stream of the scene is produced; at a client connected to the communication network, the first and second video streams are received and at least one video stream parameter of the first set of video stream parameters is caused to be adjusted such that a bit rate of the first video stream is affected; at the digital video camera, the producing of the first video stream is continuously adjusted based on the caused adjustment of the at least one video stream parameter of the first set of video stream parameters; and on a display of the client, a portion of each frame of the first video stream are continuously displayed.

4 Claims, 3 Drawing Sheets

(51) Int. Cl.
*H04N 21/2343* (2011.01)
*H04N 21/4223* (2011.01)
*H04N 21/431* (2011.01)
*H04N 21/6379* (2011.01)
*G08B 13/196* (2006.01)
*H04N 7/24* (2011.01)
*H04N 9/04* (2006.01)
*H04N 5/232* (2006.01)
*H04N 101/00* (2006.01)

(56) References Cited

FOREIGN PATENT DOCUMENTS

| | | |
|---|---|---|
| EP | 1 876 828 A1 | 1/2008 |
| EP | 2 003 545 A2 | 12/2008 |
| JP | 2010124309 A | 6/2010 |
| WO | 2006027915 A1 | 3/2006 |
| WO | 2012090958 A1 | 7/2012 |

METHOD FOR CONFIGURATION OF VIDEO STREAM OUTPUT FROM A DIGITAL VIDEO CAMERA

FIELD OF INVENTION

The present invention relates to the field of configuration of digital video cameras. In particular it relates to a method for configuration of video stream output from a digital video camera.

BACKGROUND

Using different video stream parameters when creating a video stream captured be means of a digital video camera will affect video quality, bandwidth and/or storage requirements of the video stream. However, making a balanced choice of the video stream parameters depending on available bandwidth, storage capacity and desired video quality is troublesome. Hence, there is a need for an improved method of configuration of video stream output from a digital video camera.

SUMMARY

In view of the above, it is an object of the present invention to provide a method for configuration of video stream output from a digital video camera.

According to a first aspect of the invention, the above object is achieved by a method for configuration of video stream output from a digital video camera. The method comprising: at the digital video camera being connected to a communication network, producing, using a first set of video stream parameters, a first video stream of a scene; at the digital video camera, producing, using a second set of video stream parameters, a second video stream of the scene; at a client being connected to the communication network, receiving the first and second video streams; at the client, causing at least one video stream parameter of the first set of video stream parameters to be adjusted such that a bit rate of the first video stream is affected; determining the bit rate of the first video stream; at the digital video camera, continuously adjusting the producing of the first video stream based on the caused adjustment of the at least one video stream parameter of the first set of video stream parameters; and on a display of the client, continuously displaying at least a portion of each frame of the first video stream, at least a portion of each frame of the second video stream and data pertaining to the determined bit rate of the first video stream.

By using the method according to the present invention it is very easy to tune the video stream parameter values, and directly see the impact of each change for each of the video streams. The impact of each change may be seen by studying the quality of the displayed first and/or second video stream. Furthermore, the impact of each change may be seen as the displayed data pertaining to the bit rate for each stream. Surveillance needs vary from situation to situation and prioritizations between quality and bandwidth/storage are best left to the user. When satisfied each configuration of video stream parameters for each video stream is saved to a respective video stream profile. Hence, according to the present invention it is possible to compare and directly see the impact when changing different video stream parameters for a video stream configuration or profile. Hence, it is easy to tune e.g. the frame rate, resolution or compressing settings to get an acceptable video and at the same time ensure that the video stream can be saved for a desired time period.

Moreover, it may also be easier to understand why a low quality stream might be preferable when the bandwidth and required storage can be directly compared between two different configurations.

Moreover, an advantage of producing two (or more) simultaneous video streams is that two (or more) video streams having different bit rates may be produced. Hence, a first low bit rate video stream (as compared to a second high bit rate stream) and a second high bit rate video stream (as compared to the first low bit rate video stream) may be produced.

The lower the bitrate of the low stream, the faster it will be able to load, etc. This is for example useful when scrubbing (moving the cursor on a recording timeline). The user will want to set the bit rate of the low bit rate video stream as low as possible while having a good enough image quality, framerate and so on.

Moreover, in a typical scenario, both video streams are stored, locally in the camera and/or on a Networked Attached Storage, NAS. The low bit rate video stream could then be used as a thumbnail to save bandwidth until inspection of the specific scene is selected.

In another scenario, the low bit rate video stream is always stored and the high bit rate video stream is only stored when an event is triggered, such as detected motion.

The method may further comprise at the client, causing at least one video stream parameter of the second set of video stream parameters to be adjusted such that a bit rate of the second video stream is affected; determining the bit rate of the second video stream; and at the digital video camera, continuously adjusting the producing of the second video stream based on the caused adjustment of the at least one video stream parameter of the second set of video stream parameters; and on the display of the client, continuously displaying data pertaining to the determined bit rate of the second video stream.

The at least one video stream parameter of the first and/or second set of video stream parameters caused to be adjusted is a video stream parameter that may be chosen from the group of video stream parameters consisting of: resolution of the video stream, frame rate of the video stream, contrast of the video stream, noise reduction settings for the video stream, color adjustment settings for the video stream, color space mappings of the video stream and compressing settings for the video stream.

The data pertaining to the determined bit rate of the first and/or second video stream may comprise the determined bit rate itself and/or a storage estimation value expressed in time units of data of the video stream that may be saved per memory unit of an image data storage used for storing the first and/or second video stream.

The act of continuously displaying may comprise continuously displaying a portion of each frame of the first video stream and a portion of each frame of the second video stream.

The first and second video streams may depict the same scene.

By displaying a portion of each frame of the first video stream and a portion of each frame of the second video stream the two video streams depicting the same scene is combined into "one" video stream so that the scene may be viewed in two different qualities corresponding to the qualities of the first and second video streams.

The portion of each frame of the second video stream may be complementary to the portion of each frame of the first video stream such that a single view of the scene depicted by the first and second video streams is displayed.

The digital video camera may comprise an image sensor unit and the first and second video streams may be captured by the image sensor unit of the digital video camera.

Generally, all terms used in the claims are to be interpreted according to their ordinary meaning in the technical field, unless explicitly defined otherwise herein. All references to "a/an/the [device, object, step etc.]" are to be interpreted openly as referring to at least one instance of said device, object, step etc., unless explicitly stated otherwise. The steps of any method disclosed herein do not have to be performed in the exact order disclosed, unless explicitly stated.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The systems and devices disclosed herein will be described during operation.

Figure 1:
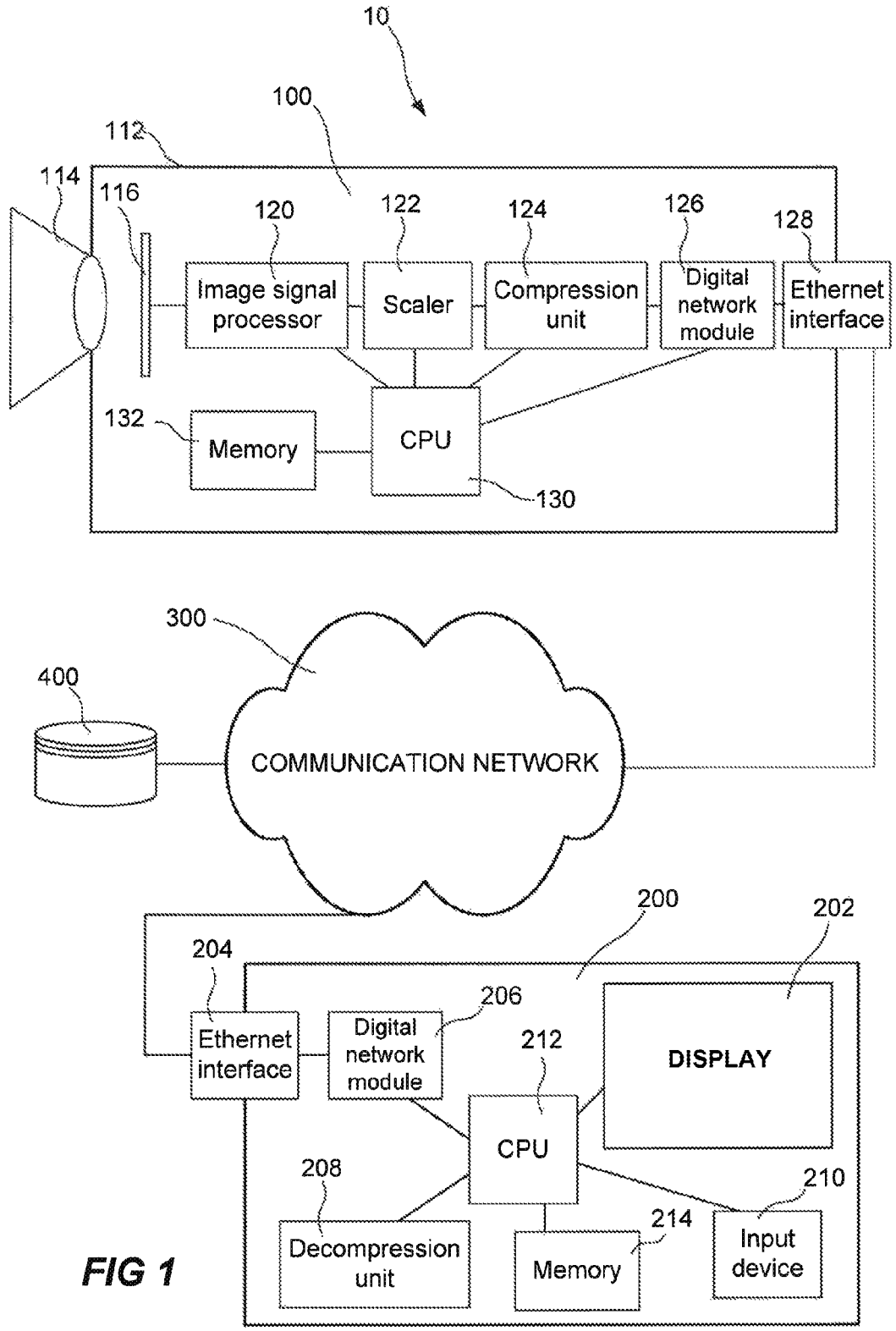
FIG. 1 is a schematic view of a system used for implementing the method for configuration of video stream output from a digital video camera according to the present invention.

FIG. 1 illustrates a system 10. The system comprises a digital video camera 100 and a user interface in the form of a client 200 comprising a display 202. The camera 100 and the client 200 are interconnected via a communication network 300. The communication network 300 may be any kind of communication network for communicating digital information, such as a wire line or wireless data communication network, e.g. a local area network (LAN) or a wireless local area network (W-LAN) or a Wide Area Network (WAN). The communication network 300 may also be a network of networks, such as the internet.

The digital video camera 100 comprises a housing 112, a lens 114, an image sensor unit 116, an image signal processing unit 120, a scaler 122, a compression unit 124, a digital network module 126, an Ethernet interface 128, a CPU 130 and a memory 132.

The digital video camera 100 is arranged to be connected to the communication network 300 via the Ethernet interface 128. The connection to the communication network 300 may be wired or wireless. Thus, the Ethernet interface 128 may be a network port adapted to 10/100/1000 Mbps data traffic, such as an Ethernet port, a modular port being arranged to receive a modular connector, e.g. a RJ45 connector. Normally such a RJ45 connector port is arranged to receive a network cable, such as a twisted pair cable (e.g. of cat 5, cat 5e or cat 6). Alternatively the I/O means may be a wireless I/O means using mobile internet standards (i.e. 1G, 2G, 2.5G, 2.75G, 3G, 3.5G, 3.75G, 3.9G, 4G) or using WiFi.

The image capturing components of the digital video camera 100, i.e. the lens 114 and the image sensor unit 116, are arranged to capture images of a scene viewed by the digital video camera 100. Hence, an image captured by the digital video camera 100 is a representation of a scene within the field of view of the digital video camera 100 in accordance with light emanating from the scene and passing into the digital video camera 100. The lens 114 focuses the images onto the image sensor unit 116.

The image sensor unit 116 is arranged to transform the captured images into electrical signals. The image sensor unit 116 comprises an image sensor for instance a CCD, CMOS or any other kind of Focal Plane Arrays, such as an IR or thermal imager sensor. The image sensor is arranged to convert the image into an analog electric signal. The image sensor unit 116 further comprises an Analog to Digital (A/D) converter. The A/D converter is arranged to convert the analog electrical signal into a digital electrical signal. Thus, the images being focused onto the image sensor are converted into analog electrical signals and thereafter converted by means of the A/D converter into a digital image signal. The digital image signal is transferred into the image signal processing unit 120 for forming frames of a video stream. A frame is a signal or an amount of data representative of the image captured at a particular time.

According to the present invention the image signal processing unit 120 is arranged to process the same digital image signal into frames of at least two video streams of subsequent frames. Accordingly, the digital image signal is processed according to a first processing scheme or first mode in order to create a first video stream and the same digital image signal is processed ones again, this time according to a second processing scheme or a second mode, in order to create a second video stream. The first processing scheme or first mode may be optimized for a first application and the second processing scheme or second mode may be optimized for a second application. Hence, the image signal processing unit 120 is arranged to generate at least two video streams of subsequent video frames, wherein the at least two video streams are generated using the same digital image signal. Thus, the image signal processing unit 120 is arranged to process the digital image signal at least twice in order to generate a first and a second video stream. The first and the second video streams are hence depicting the same scene captured by the digital video camera.

Video stream parameters that may be altered between the different processing schemes or modes are e.g. resolution of the video stream, frame rate of the video stream, contrast of the video stream, noise reduction settings for the video stream, color adjustment settings for the video stream and color space mappings of the video stream. When altering one or more of these video stream parameters the bit rate of the created video stream is influenced/altered.

Hence, the image signal processing unit 120 may be arranged such that the frame rate, resolution, contrast, noise reduction settings, color adjustment settings and/or color space mappings of the created first and/or second video streams may be altered.

The processing of the digital image signal in order to generate the first and second video streams using said first and second mode may be performed concurrently by using an image signal processing unit 120 comprising more than one processing block. Thus, according to this embodiment the processing of the digital image signal in order to generate the first and second video streams using said first and second mode is performed in parallel. Alternatively, the processing of the digital image signal in order to generate the first and second video streams using said first and second mode may be performed serially, i.e. the digital image signal is first processed ones using the first mode in order to generate at least a part of the first video stream and the same digital image signal is subsequently processed using the second mode in order to generate at least a part of the second video stream. Thus, according to this embodiment the processing of the digital image signal in order to generate the first and second video streams using said first and second mode is performed serially.

According to yet another embodiment the monitoring device may comprise more than one image signal processing unit 120. Using this embodiment the processing of the same digital image signal in order to generate the first and second video streams using said first and second mode may be performed in parallel.

Accordingly, using a digital video camera concurrent generation of at least two video streams, wherein the video streams of subsequent video frames may be optimized, calibrated or set up differently, is enabled.

The image signal processing unit 120 may comprise a plurality of application specific signal processors in case of a hardware solution.

The image signal processing unit 120 may be arranged as software code portions stored in the digital video camera 100 and adapted to process the digital image signal when executed in one or more processing units or CPU:s within the digital video camera 100.

The scaler 122, the compression unit 124 and/or the digital network module 126 may also arranged to process the frames before they are being sent out over the communication network 300.

The scaler 122 is arranged to transform the generated frames into desired frame size. The scaler 122 may moreover be arranged to correct geometrical distortions in the frames.

The compression unit 124 is arranged to compress the frames of each video stream. The compressing is normally made according to a predefined standard, such as H.264, M-JPEG or MPEG. Each video stream may be compressed individually. Thus, one video stream may be compressed using the H.264 standard whereas another video stream may be compressed using another type of compressing, i.e. MPEG. However, it is to be understood that each video stream may be compressed using the same compressing scheme. Moreover, it is also to be understood that at least one of the video streams may not be compressed. Furthermore, each video stream may be compressed using the same compressing standard, e.g. H.264, however each video stream is compressed using different compressing parameters within the standard.

The choice of compression standard and/or compressing parameters within a specific standard is examples of video stream parameters affecting the bite rate of a video stream.

The digital network module 124 is arranged to transmit and receive digital signals. Thus, the digital network module 124 is arranged to process and prepare the video streams for transmission through the digital network via the Ethernet interface 128. The digital network module 124 is also arranged to process other kind of digital data being transmitted or received by the digital video camera 100.

The CPU 130 of the digital video camera 100 controls the functions and processes of the digital video camera 100. The CPU 130 is able to store digital data in the memory 132 of the digital video camera 100.

The client 200 comprises a display 202, an Ethernet interface 204, a digital network module 206, a decompression unit 208, an input device 210, a CPU, 212 and a memory 2014.

The client 200 is arranged to be used during configuration of video streams (e.g. the first and second video streams) being outputted from the digital video camera 100.

The client 200 is arranged to be connected to the communication network 300 via the Ethernet interface 204. The connection to the communication network 300 may be wired or wireless. Thus, the Ethernet interface 204 may be a network port adapted to 10/100/1000 Mbps data traffic, such as an Ethernet port, a modular port being arranged to receive a modular connector, e.g. a RJ45 connector. Normally such a RJ45 connector port is arranged to receive a network cable, such as a twisted pair cable (e.g. of cat 5, cat 5e or cat 6). Alternatively the I/O means may be a wireless I/O means using mobile internet standards (i.e. 1G, 2G, 2.5G, 2.75G, 3G, 3.5G, 3.75G, 3.9G, 4G) or using WiFi.

The digital network module 206 is arranged to transmit and receive digital signals. Thus, the digital network module 206 is arranged to process video streams received by the client 200. The digital network module 206 is also arranged to process other kind of digital data being received or transmitted by the client 200.

In case of the video stream(s) being received by the client 200 is compressed the decompression module 208 is arranged to decompress the compressed video streams. As mentioned above different compression/decompression standards may be used.

The CPU 212 is arranged to determine data pertaining to characteristics of the received video stream(s). The data pertaining to characteristics of the received video stream(s) may e.g. be data pertaining to the determined bit rate of the received video stream(s). The data pertaining to the determined bit rate may e.g. comprise the determined bit rate itself and/or a storage estimation value expressed in time units of data of the respective video stream that may be saved per memory unit of an image data storage used for storing the video stream(s). Moreover, the CPU 212 of the client 200 controls the functions and processes of the client 200. The CPU 212 is able to store digital data in the memory 214 of the client 200.

The display 202 is arranged to display the received video stream(s). The display 202 is further arranged to display data pertaining to characteristics of the received video stream(s).

The input device 210 is arranged for receiving user input. The input device 210 may e.g. be a mouse, a keyboard, a trackball or any other kind of suitable input device for receiving user input to the client 200.

The system may also comprise one or more storage units 400 for storing digital information. The storage unit 400 may e.g. be arranged to store one or both of the video streams created by the digital video camera 100.

Below configuration of video stream output from the digital video camera 100 using the client 200 will be discussed.

The first and the second video streams generated by the digital video camera 100 are displayed on the display 202 of the client 200 beside each other in a split view 20. The split view 20 may e.g. be a vertical split view 20, see FIG. 2.

Thus, a portion of each frame of the first video stream 22 and a portion of each frame of the second video stream 24 are continuously displayed on the display 202. The portion of each frame of the second video stream 24 is complementary to the portion of each frame of the first video stream 22 such that a single view of the scene depicted by the first and second video streams is displayed.

It shall be noted that the first video stream is generated using the first processing scheme or first mode of the image signal processing unit 120 and the second video stream is generated using the second processing scheme or second mode of the image signal processing unit 120.

It shall be understood that instead of using a vertical split a horizontal split or any other kind of split may be used. By using a split view the two video streams depicting the same scene is combined into "one" video stream so that the scene may be viewed in two different qualities corresponding to the qualities of the first and second video streams.

Figure 2:
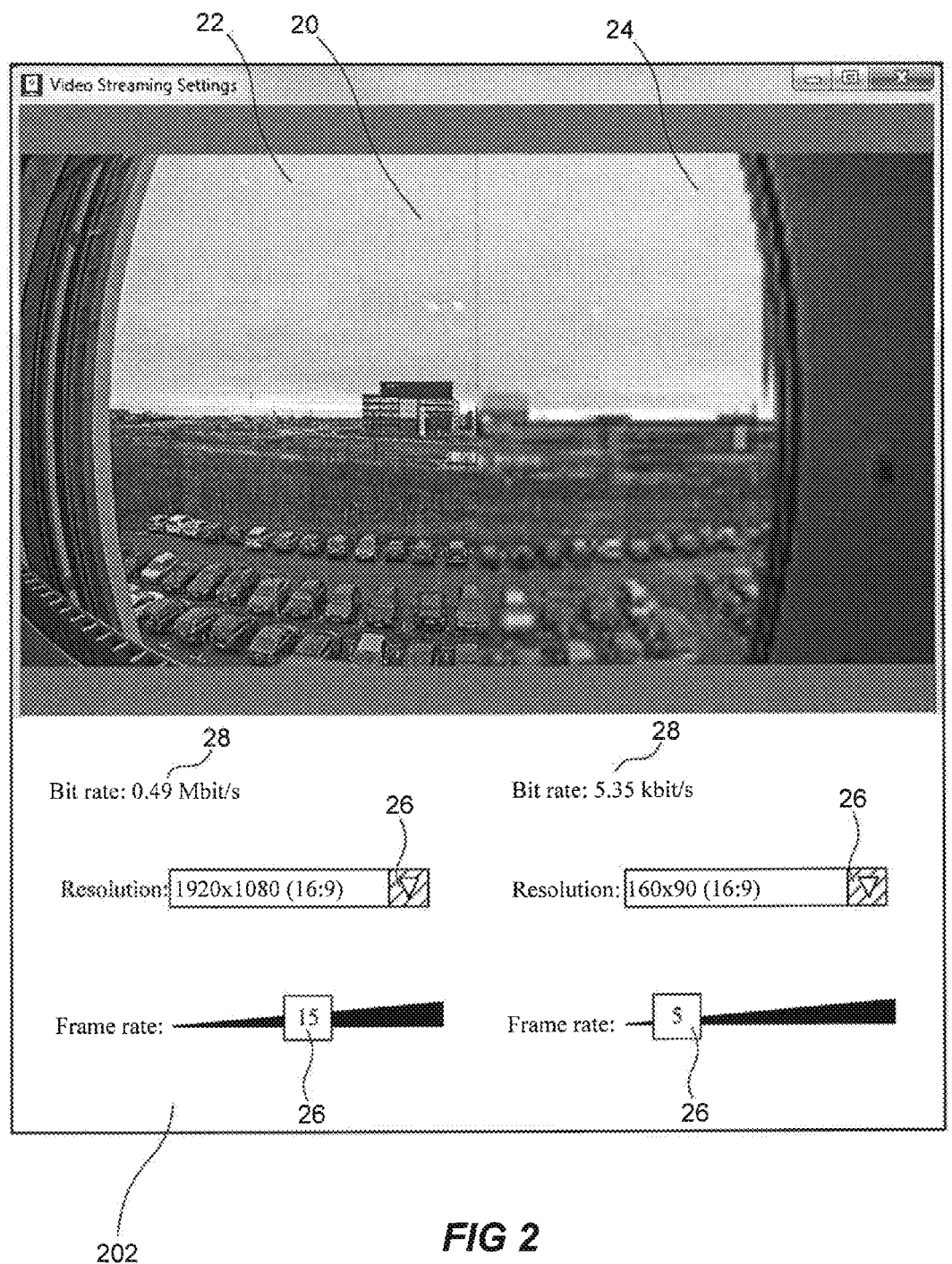
FIG. 2 is a schematic view of a user interface on the client used for performing the method for configuration of video stream output from a digital video camera according to the present invention.

In FIG. 2 the left half of the displayed video represents a high quality configuration and the right half represents a low quality configuration. It shall also be noticed that the first and second video streams are displayed as live views of the generated video streams.

It shall further be noticed that one video stream could take up less space of the split view 20 than the other. Moreover, additional video streams could potentially also be added to the split view 20.

Furthermore, it shall further be understood that no split at all may be used; thus, each full frame of each stream may be displayed. Hence, according to this embodiment each full frame of the first video stream and each full frame the of second video stream are continuously displayed on the display 202.

In connection with the displaying of the first and the second video streams also controls 26 for adjusting one or more video stream parameters of each of the video streams is displayed on the display 202. The controls 26 may be used for adjusting different video stream parameters. Some none limiting examples of video stream parameters that may be adjusted are: resolution of the video stream, frame rate of the video stream, contrast of the video stream, noise reduction settings for the video stream, color adjustment settings for the video stream, color space mappings of the video stream and compressing settings for the video stream. In FIG. 2 controls 26 for adjusting resolution and frame rate of the respective video stream are depicted.

By using the input device 210 the controls 26 may be manipulated such that one or more video parameter of each of the video streams may be changed. The changed parameter is immediately being sent to the digital video camera 100 such that the generation of the video stream is immediately adjusted. Hence, the producing of the video stream will thereafter be based on the caused adjustment of the video stream parameter. Hence, each video stream may be changed instantly by the associated control(s) 26. Each change of a video stream parameter will instantly trigger that the video stream will be generated using this new set of video stream parameters. Using the present invention it is very easy to tune the video stream parameter values, and directly see the impact of each change for each of the video stream. The impact of each change may be seen by studying the image quality of the displayed first and/or second video streams. This also allow for comparing the image quality of the first and second video streams. Furthermore, the impact of each change may be seen as displayed data 28 pertaining to the bit rate for each stream. As mentioned above, the data pertaining to the determined bit rate may e.g. comprise the determined bit rate itself (as shown in FIG. 2) and/or a storage estimation value expressed in time units of data of the respective video stream that may be saved per memory unit of an image data storage used for storing the video stream(s). Surveillance needs vary from situation to situation and prioritizations between quality and bandwidth/storage are best left to the user. When satisfied the dialog comprising the displayed video streams and the controls for adjusting video stream parameters may be closed and each configuration of video stream parameters for each video stream is saved to a respective video stream profile. The video stream profiles are preferably stored in a memory of the digital video camera 100.

Hence, according to the present invention it is possible to compare and directly see the impact when changing different video stream parameters for a video stream configuration or profile. Hence, it is easy to tune e.g. the frame rate, resolution or compressing settings to get an acceptable video and at the same time ensure that the material can be saved for the number of days you like. Moreover, it may also be easier to understand why a low quality stream might be preferable when the bandwidth and required storage can be directly compared between each configuration.

Figure 3:
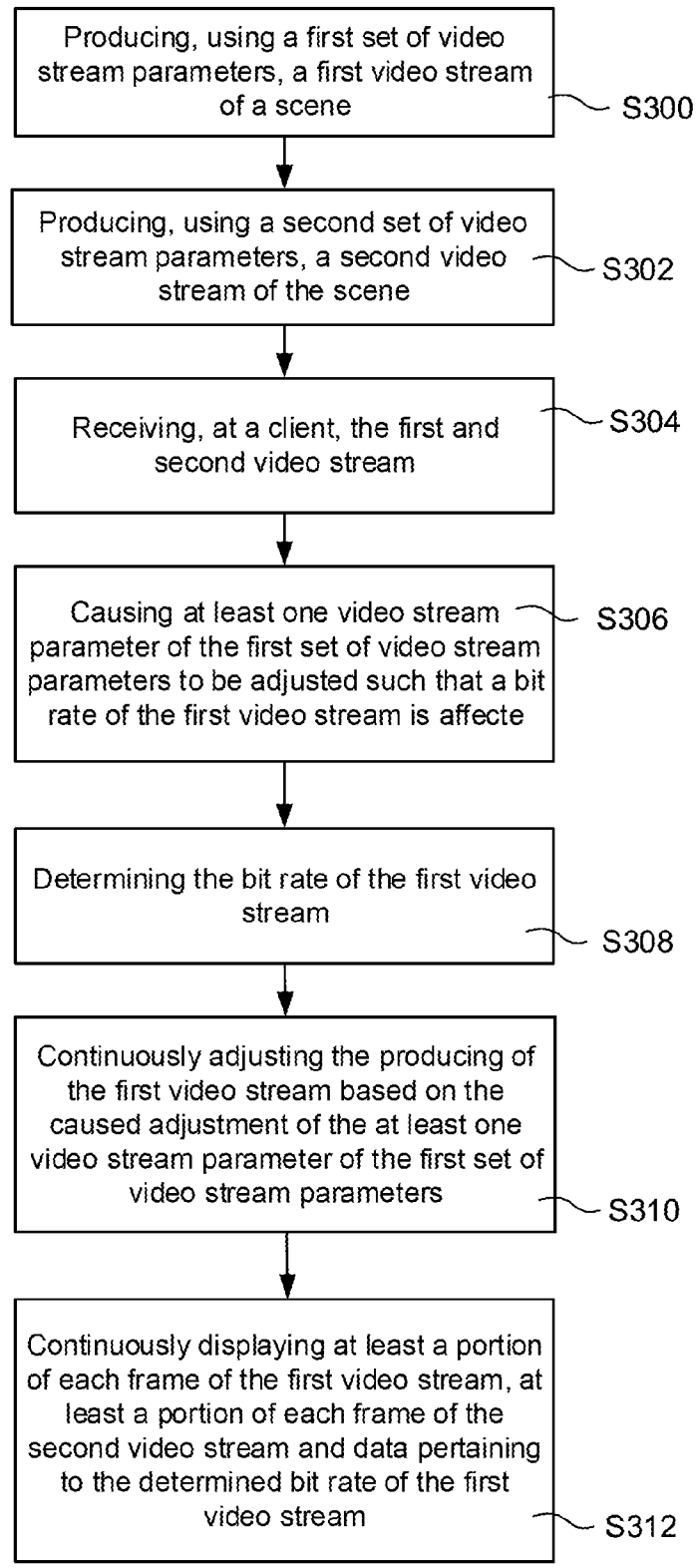
FIG. 3 is a block diagram of an embodiment of a method for configuration of video stream output from a digital video camera according to the present invention.

With reference to FIG. 3 a method for configuration of video stream output from a digital video camera will be discussed. The method comprising: at the digital video camera being connected to a communication network, producing S300, using a first set of video stream parameters, a first video stream of a scene; at the digital video camera, producing S302, using a second set of video stream parameters, a second video stream of the scene; at a client being connected to the communication network, receiving S304 the first and second video streams; at the client, causing S306 at least one video stream parameter of the first set of video stream parameters to be adjusted such that a bit rate of the first video stream is affected; determining S308 the bit rate of the first video stream; at the digital video camera, continuously adjusting S310 the producing of the first video stream based on the caused adjustment of the at least one video stream parameter of the first set of video stream parameters; and on a display of the client, continuously displaying S312 at least a portion of each frame of the first video stream, at least a portion of each frame of the second video stream and data pertaining to the determined bit rate of the first video stream.

Additionally, variations to the disclosed embodiments can be understood and effected by the skilled person in practicing the claimed invention, from a study of the drawings, the disclosure, and the appended claims. For example, instead of being stored locally on the digital video camera 100 each video stream profile may be stored on another storage unit, adapted to store digital information, being connected to the communication network 300.

Moreover, in the drawings and specification, there have been disclosed preferred embodiments and examples of the invention and, although specific terms are employed, they are used in a generic and descriptive sense only and not for the purpose of limitation, the scope of the invention being set forth in the following claims. In the claims, the word "comprising" does not exclude other elements or steps, and the indefinite article "a" or "an" does not exclude a plurality.

What is claimed is:

1. A method for configuration of video stream output from a digital video camera arranged to produce a first and a second video stream depicting a same scene, the method comprising:

at the digital video camera, the digital video camera being connected to a communication network, producing, using a first set of video stream parameters, the first video stream of the scene;

at the digital video camera, producing, using a second set of video stream parameters, the second video stream of the scene;

at a client being connected to the communication network, receiving the first and second video streams;

at the client, causing at least one video stream parameter of the first set of video stream parameters to be adjusted such that a bit rate of the first video stream is affected and causing at least one video stream parameter of the second set of video stream parameters to be adjusted such that a bit rate of the second video stream is affected, wherein the at least one video stream parameter caused to be adjusted is a video stream parameter chosen from the group of video stream parameters consisting of: resolution of the video stream, frame rate of the video stream, contrast of the video stream, noise reduction settings for the video stream, color adjustment settings for the video stream, color space mappings of the video stream and compressing settings for the video stream;

determining the bit rate of the first video stream and determining the bit rate of the second video stream;

at the digital video camera, continuously adjusting the producing of the first video stream based on the caused adjustment of the at least one video stream parameter of the first set of video stream parameters and continuously adjusting the producing of the second video stream based on the caused adjustment of the at least one video stream parameter of the second set of video stream parameters; and on a display of the client, continuously displaying a portion of each frame of the first video stream, a portion of each frame of the second video stream, and data pertaining to the determined bit rate of the first video stream and the second video stream, wherein the act of continuously displaying comprises continuously displaying a portion of each frame of the first video stream and a portion of each frame of the second video stream, wherein the first and second video streams are displayed on the display of the client beside each other in a split view, wherein the portion of each frame of the second video stream is complementary to the portion of each frame of the first video stream, wherein the data pertaining to the determined bit rate of the first and/or second video stream comprises the determined bit rate itself and/or a storage estimation value expressed in time units of data of the video stream that may be saved per memory unit of an image data storage used for storing the first and/or second video stream.

2. The method according to claim 1, further comprising storing the adjusted video stream parameter locally at the digital video camera.

3. The method according to claim 1, wherein the digital video camera comprises an image sensor unit and wherein the first and second video streams are captured by the image sensor unit of the digital video camera.

4. The method according to claim 2, wherein the at least one video stream parameter of the second set of video stream parameters caused to be adjusted is a video stream parameter chosen from the group of video stream parameters consisting of: resolution of the video stream, frame rate of the video stream, contrast of the video stream, noise reduction settings for the video stream, color adjustment settings for the video stream, color space mappings of the video stream and compressing settings for the video stream.

* * * * *